United States Patent [19]

Fleming

[11] Patent Number: 4,979,703

[45] Date of Patent: Dec. 25, 1990

[54] DISPENSING TUBE RETAINING CLAMP

[75] Inventor: Steven M. Fleming, San Diego, Calif.

[73] Assignee: The Dow Chemical Company, Midland, Mich.

[21] Appl. No.: 528,404

[22] Filed: May 25, 1990

[51] Int. Cl.⁵ .............................................. F16L 3/08
[52] U.S. Cl. ........................................ 248/65; 248/72
[58] Field of Search .................... 248/49, 65, 72, 74.1, 248/68.1, 231.4; 24/557, 499, 500, 501

[56] References Cited

U.S. PATENT DOCUMENTS

| | | | |
|---|---|---|---|
| 950,978 | 3/1910 | Williams | 248/72 |
| 1,573,218 | 2/1926 | Bieder | 248/231.5 |
| 1,991,364 | 2/1935 | Matter | 248/231.5 X |
| 2,716,043 | 8/1955 | Baril | 248/231.5 X |
| 3,111,296 | 11/1963 | Ludes | 248/231.5 X |
| 3,276,800 | 10/1966 | Loudon | 248/72 X |
| 3,437,339 | 4/1969 | Starck | 24/501 X |
| 3,544,056 | 12/1970 | Berquist | 248/231.5 X |
| 3,567,169 | 3/1971 | Frederick | 248/72 X |
| 4,019,705 | 4/1977 | Habuda | 248/72 X |

Primary Examiner—J. Franklin Foss

[57] ABSTRACT

Dispensing tube and spring clamp asembly comprising a hinged jaw spring clamp adapted to train the dispensing end of a delivery tube and to hold it in a fixed position while fluid material is dispensed under pressure therethrough.

2 Claims, 1 Drawing Sheet 4,979,703

DISPENSING TUBE RETAINING CLAMP

FIELD OF THE INVENTION

The present invention relates to a dispensing tube assembly, and more particularly to a dispensing tube assembly comprising a retaining clamp for the directional control of the dispensing end of a delivery tube for a pressurized fluid.

BACKGROUND OF THE INVENTION

When liquids or aerosols are dispensed through a tube or hose from a pressurized tank there is commonly a problem in maintaining control of the dispensing end of the delivery tube due to the stream of material coming therefrom under pressure. There is a tendency for the end of the tube to whip around which is proportional to the exit velocity of the dispensed material. Frequently, it is important for the dispensed material to be applied or directed with discrimination, as, for example, when dispensing an insecticide, a fumigant or other material into the atmosphere of an enclosed space, such as the interior of a warehouse or other building.

Many dispensing tube assemblies are very light in weight, and end simply with the end of the tube. These are particularly prone to the aforementioned problem. It would be advantageous to have a dispensing tube assembly which permits the dispensing end of a delivery tube to be controlled or held in a fixed position, and which permits the dispensed material to be applied accurately and precisely.

SUMMARY OF THE INVENTION

The present invention relates to a dispensing tube and spring clamp assembly comprising a hinged jaw spring clamp adapted to train the dispensing end of a delivery tube comprising two mutually opposed lever arms, each lever arm having a jaw end, a handle end and central portion connecting said ends, the central portions being hinged together by hinge means and the handle ends being biased apart and, simultaneously, the jaw ends being biased together by resilient spring means between the lever arms, at least one of said lever arms having a hole therethrough adjacent to the handle end to serve as a tubing guide and the jaw end of said at least one lever arm having an additional tubing guide in the form of a collar member with a hole therethrough for tubing, said additional tubing guide being fixedly attached at an edge thereof to the jaw and being sufficiently upstanding from the jaw end to readily admit tubing through said hole therein, with the delivery tube trained through the hole adjacent to the handle end in said at least one of said lever arms with the dispensing end of said delivery tube trained through and extending beyond the collar member serving as said additional tubing guide.

DESCRIPTION OF THE PREFERRED EMBODIMENTS

Figure 1:
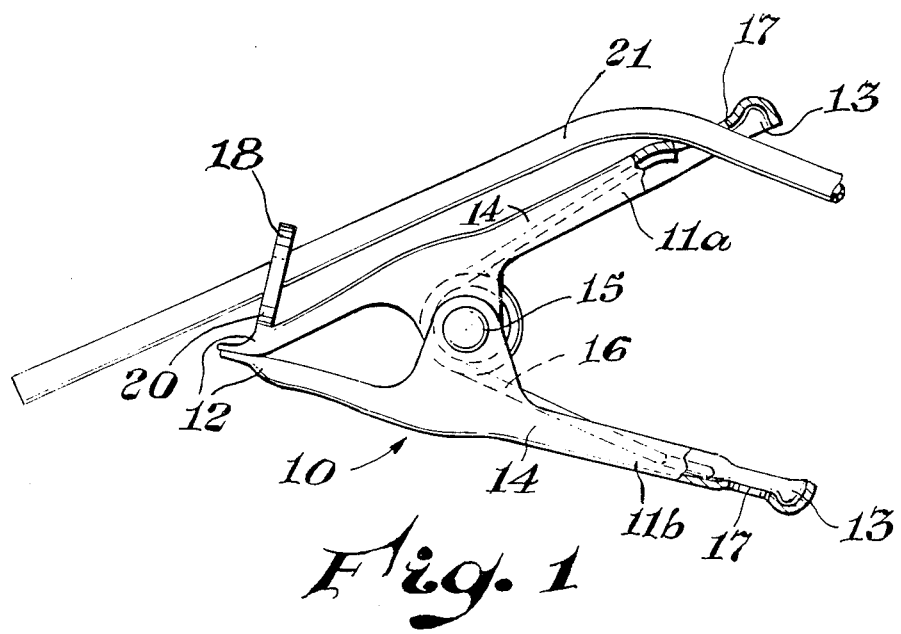
FIG. 1 is a side view of the dispensing tube and spring clamp assembly.

FIG. 1 shows the basic features of the dispensing tube and spring clamp assembly. The main part of the assembly is a hinged jaw spring clamp 10 comprising two mutually opposed lever arms 11a and 11b which each have a jaw end 12 and a handle end 13 and a central portion 14 which connects the ends. The central portions 14 are hinged together by hinge means 15 with the handle ends 13 being biased apart while the jaw ends 12 are simultaneously biased together by resilient spring means 16. At least one of said lever arms has a hole 17 therethrough adjacent to the handle end 13 which serves as a tubing guide. The jaw end of the same lever arm has an additional tubing guide 18 in the form of a collar member with a hole 19 therethrough for tubing. The additional tubing guide is fixedly attached at an edge 20 thereof to the jaw end 12 of the said same lever arm and is sufficiently upstanding from the jaw end to readily admit a delivery tube 21 through the hole therein, with the dispensing end of the tube extending beyond the collar member 18.

Figure 2:
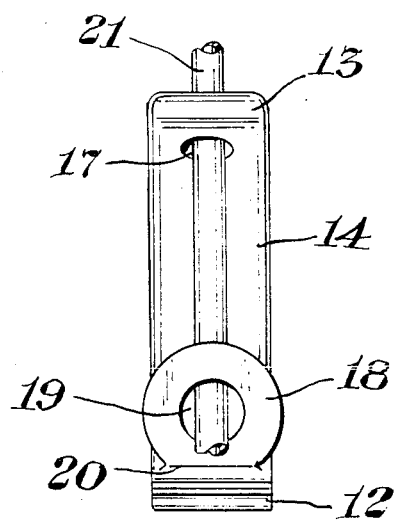
FIG. 2 is a top view of one of the lever arms of the spring clamp.

FIG. 2 shows a top view of the lever arm of the spring clamp which features the handle end 13 with the adjacent hole 17 through which is trained the dispensing tube 21 which then passes over the central portion 14 of the lever arm to the additional tubing guide 18 and is trained therethrough. The additional tubing guide is attached at an edge 20 thereof, as by brazing or welding, to the jaw end 12 of the lever arm upon which it is positioned.

In the particular embodiment of the present invention shown in FIG. 1 and FIG. 2, the basic clamp employed is commonly available and known as a "Pony Clip #3201". A flat metal washer has been brazed to the outer side of the tip of the clip to form the additional tubing guide at the tip. The angle between the plane of the washer in the direction of flatness and the plane of the length of the handle is approximately a right angle, but, since the exact angle is not critical, the angle may vary from normal, i.e. 90° by about 45° in either direction.

The delivery tube in this embodiment is approximately ⅛ inch I.D. (inside diameter), but the size of the tube may range from about 1/128 inch I.D. to about 1 inch I.D. as may be dictated by the nature and use of the material being dispensed. The delivery tube commonly is attached to a pressurized canister or cylinder of material to be dispensed through the delivery tube, and when not in use, it is convenient to secure the dispensing tube assembly to another object by means of the spring clamp.

It is an essential feature and advantage of this invention that, when in use, the dispensing tube assembly provides a secure means to hold and direct the dispensing end of the delivery tube. Another advantage of the novel modified spring clamp is that it is easily used interchangeably with various delivery tubes, e.g., fixedly attached to various pressurized canisters or cylinders.

What is claimed is:

1. A hinged jaw spring clamp adapted to train the dispensing end of a delivery tube for a pressurized fluid comprising two mutually opposed lever arms, each lever arm having a jaw end, a handle end and central portion connecting said ends, the central portions being hinged together by hinge means and the handle ends being biased apart and the jaw ends being simultaneously biased together by resilient spring means between the lever arms, at least one of said lever arms having a hole therethrough adjacent to the handle end to serve as a tubing guide and the jaw end of said at least one lever arm having an additional tubing guide in the form of a collar member with a hole therethrough for tubing, said additional tubing guide being fixedly attached at an edge thereof to the jaw end and being sufficiently upstanding from the jaw end to readily admit tubing through said hole therein.

2. A dispensing tube and spring clamp assembly comprising a delivery tube for a pressurized fluid and a hinged jaw spring clamp adapted to train the dispensing end of said delivery tube comprising two mutually opposed lever arms, each lever arm having a jaw end, a handle end and central portion connecting said ends, the central portions being hinged together by hinge means and the handle ends being biased apart and the jaw ends being simultaneously biased together by resilient spring means between the lever arms, at least one of said lever arms having a hole therethrough adjacent to the handle end to serve as a tubing guide and the jaw end of said at least one lever arm having an additional tubing guide in the form of a collar member with a hole therethrough for tubing, said additional tubing guide being fixedly attached at an end thereof to the jaw end and being sufficiently upstanding from the jaw end to readily admit tubing through said hole therein, with the delivery tube trained through the hole adjacent to the handle end in said at least one of said lever arms with the dispensing end of said delivery tube trained through and extending beyond the collar member serving as said additional tubing guide.

* * * * *